(12) United States Patent  (10) Patent No.: US 9,000,608 B2
Sakakibara et al.  (45) Date of Patent: Apr. 7, 2015

(54) POWER-SUPPLY UNIT AND POWER SUPPLY (75) Inventors: Norihisa Sakakibara, Aichi-ken (JP); Sadanori Suzuki, Aichi-ken (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 755 days.

(21) Appl. No.: 13/273,620

(22) Filed: Oct. 14, 2011

(65) Prior Publication Data

US 2012/0091791 A1 Apr. 19, 2012

(30) Foreign Application Priority Data

Oct. 19, 2010 (JP) ................ P2010-234158

(51) Int. Cl.
| | |
|---|---|
| B60L 1/00 | (2006.01) |
| B60L 3/00 | (2006.01) |
| H02G 3/00 | (2006.01) |
| F02N 11/08 | (2006.01) |
| F02N 15/00 | (2006.01) |
| H02J 7/00 | (2006.01) |

(52) U.S. Cl.
CPC ........ F02N 11/0862 (2013.01); F02D 2400/14 (2013.01); F02D 2400/18 (2013.01); F02N 15/00 (2013.01); F02N 2200/063 (2013.01); F02N 2250/02 (2013.01); H02J 7/0065 (2013.01)

(58) Field of Classification Search
CPC ............... F02N 15/00; F02N 11/0862; F02N 2200/063; H02J 7/0065
USPC ................................. 307/9.1, 10.1
See application file for complete search history.

(56) References Cited

U.S. PATENT DOCUMENTS

| | | | |
|---|---|---|---|
| 2001/0028197 A1 | 10/2001 | Yamane et al. | |
| 2002/0190690 A1* | 12/2002 | Tamai et al. | ............... 320/103 |
| 2003/0045137 A1 | 3/2003 | Yamane et al. | |
| 2008/0246443 A1 | 10/2008 | Doljack | |

(Continued)

FOREIGN PATENT DOCUMENTS

| | | |
|---|---|---|
| CN | 101340069 A | 1/2009 |
| DE | 199 29 305 A1 | 12/2000 |

(Continued)

OTHER PUBLICATIONS

Extended European Search Report for corresponding EP Patent Application No. 11184804.0 issued on Feb. 24, 2012.

*Primary Examiner* — Rexford Barnie
*Assistant Examiner* — Toan Vu
(74) *Attorney, Agent, or Firm* — Sughrue Mion, PLLC (57) ABSTRACT

A power-supply unit has an electric connection box operable to supply an electric power of a battery to loads and a power supply operable to control first voltage supplied from the battery and outputted through the electric connection box and supply second voltage into which the first voltage is controlled in the power supply to the loads through the electric connection box. The electric connection box includes an electric connection box side input terminal connectable to the battery and an electric connection box side output terminal connectable to the loads. The power supply includes a power supply side input terminal that is directly connected to the electric connection box side input terminal and a power supply side output terminal that is directly connected to the electric connection box side output terminal. The power supply is directly supported by and fixed to the electric connection box.

13 Claims, 9 Drawing Sheets

(56) References Cited

U.S. PATENT DOCUMENTS

2009/0009978 A1    1/2009  Fujimaki
2009/0098749 A1*   4/2009  Hashikura et al. ........... 439/76.2
2010/0066166 A1*   3/2010  Yoshinaga et al. ............. 307/9.1

FOREIGN PATENT DOCUMENTS

| JP | 09-277840 A   | 10/1997 |
| JP | 200013962 A   | 1/2000  |
| JP | 2000-134813 A | 5/2000  |
| JP | 2005-038756 A | 2/2005  |
| JP | 2005-237149 A | 9/2005  |
| JP | 2006256442 A  | 9/2006  |
| JP | 2008293853 A  | 12/2008 |
| JP | 2010-058609 A | 3/2010  |

* cited by examiner

POWER-SUPPLY UNIT AND POWER SUPPLY

BACKGROUND OF THE INVENTION

The present invention relates to a power-supply unit having a power supply controlling the voltage of a battery mounted on a vehicle.

In a so-called no-idling vehicle in which idling stop control is performed such that the engine of the vehicle is automatically stopped and started in accordance with operating state of the vehicle, the engine repeats restarting. Such no-idling vehicle is equipped with an auxiliary power supply for providing the voltage required for operating electric parts such as automotive audio equipment and a vehicle navigation system thereby to prevent the electric parts from malfunctioning or being reset due to a battery voltage drop at a restart of the engine. As an example of such power supply, Japanese Patent Application Publication 2005-237149 discloses a power supply that provides voltage boosted by turning on and off switching elements to electric parts at a restart of the engine and provides voltage to the electric parts through coils and diodes in the power supply without turning on and off the switching elements during normal operation of the vehicle except restarting of the engine.

As another example of such power supply, Japanese Patent Application Publication H09-277840 discloses a power supply in which the voltage of battery of an electric vehicle is stepped down and then supplied to auxiliary electric parts of the vehicle.

The power supply is large in size and also heavy, so that, in fixing the power supply to a vehicle by bolts and brackets, the vehicle needs have therein an extra space for receiving power supply and the degree of freedom in designing the vehicle decreases.

The present invention is directed to providing a power-supply unit and a power supply which prevents a decrease of the degree of freedom in designing a vehicle in consideration of mounting a power supply other than the battery to the vehicle.

SUMMARY OF THE INVENTION

A power-supply unit has an electric connection box disposed in a vehicle compartment and operable to supply an electric power of a battery to a plurality of loads and a power supply disposed in the vehicle compartment and operable to control first voltage that is supplied from the battery and outputted through the electric connection box and supply second voltage into which the first voltage is controlled in the power supply to the plurality of loads through the electric connection box. The electric connection box includes an electric connection box side input terminal electrically connectable to the battery and an electric connection box side output terminal electrically connectable to the plurality of loads. The power supply includes a power supply side input terminal that is directly connected to the electric connection box side input terminal and a power supply side output terminal that is directly connected to the electric connection box side output terminal. The first voltage is inputted to the power supply side input terminal through the electric connection box and the second voltage is supplied to the plurality of loads through the electric connection box. The power supply is directly supported by and fixed to the electric connection box.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1:
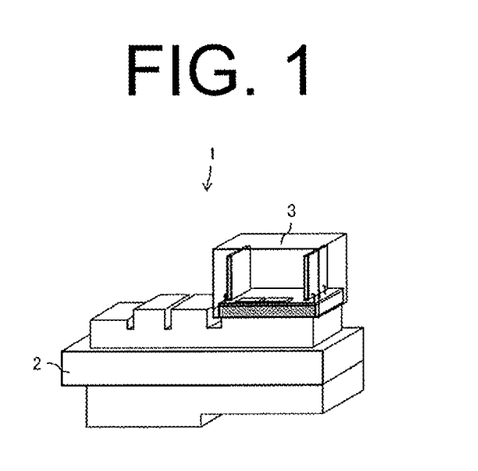
FIG. 1 is a perspective view of a power-supply unit including a power supply and a junction box according to a preferred embodiment of the present invention.

The power-supply unit is shown in FIG. 1 and designated generally by 1. The power-supply unit 1 includes a junction box 2 (corresponding to the electric connection box of the present invention) and a power supply 3 mounted to the junction box 2.

The power-supply unit 1 according to the preferred embodiment is disposed in a compartment of a no-idling vehicle, e.g. at a position adjacent to the driver seat of the vehicle. A battery that supplies electric power to a starter motor is disposed in an engine room of the vehicle. The junction box 2 is electrically connected through a harness to the battery and distributes the electric power to various electric parts, e.g., audio equipment and a navigation device installed in the no-idling vehicle.

The power supply 3 keeps the battery voltage constant and supplies the voltage to various automotive electric parts. The power supply 3 is designed with a size that permits the power supply 3 to be mounted to the junction box 2. The power supply 3 is operable to control or boost DC voltage that is outputted from the battery through the junction box 2 and to supply the boosted DC voltage to the various electric parts through the junction box 2. The DC voltage that is outputted to the power supply 3 through the junction box 2 and the DC voltage that is controlled in the power supply 3 and supplied to the various electric parts through the junction box 2 correspond to the first voltage and the second voltage of the present invention, respectively.

Alternatively, the power supply 3 may be configured to be operable to decrease the input DC voltage (i.e. the first voltage) and to output the decreased DC voltage (i.e. the second voltage). Furthermore, the power supply 3 may be configured to operable to change the input DC voltage (i.e. the first voltage) into AC voltage and to output the AC voltage (i.e. the second voltage). The vehicle which is equipped with the power-supply unit 1 is not limited to a no-idling vehicle.

Generally, the junction box 2 should be arranged in a place in the vehicle that is easy to access for facilitating the replacement of a fuse in the junction box 2. For this purpose, the power-supply unit 1 according to the embodiment is configured so that the power supply 3 is mounted to the junction box 2 and, therefore, there is no need to provide an extra space in the vehicle for arranging the power supply 3, with the result that the freedom in designing the vehicle can be increased. Additionally, the power-supply unit 1 which is disposed in a vehicle compartment, e.g. at a position adjacent to a driver seat may be installed and maintained easily.

Figure 2A:
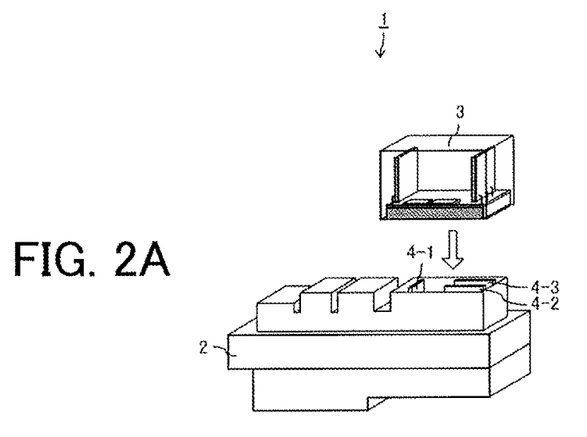
FIG. 2A is a perspective view of the power-supply unit of FIG. 1, showing a state before the power supply is mounted to the junction box.

FIG. 2A is a perspective view of the power-supply unit 1 before the power supply 3 is mounted to the junction box 2. Referring to the drawing, the junction box 2 has a plurality of male terminals 4 (or an input terminal 4-1, an output terminal 4-2, and a GND terminal 4-3 on the electric connection box side). The terminal in the present embodiment and also in the after-mentioned other embodiments includes a connector.

Figure 2B:
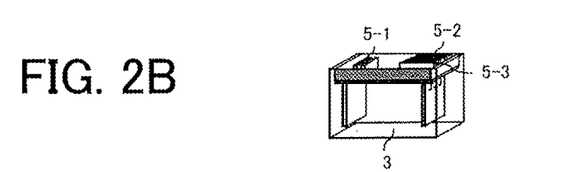
FIG. 2B is a perspective view of the power supply of FIG. 2A.

Referring to FIG. 2B, the power supply 3 has a plurality of female terminals 5 (or an input terminal 5-1, an output terminal 5-2 and a GND terminal 5-3 on the power supply side) that are electrically and mechanically connected to the terminals 4 of the junction box 2. The input terminals 5-1, 5-2, 5-3 are disposed on the lower side of the power supply 3 in a manner that the respective terminals 5-1, 5-2, 5-3 are dispersed in the lower side of the power supply 3.

Alternatively, the terminals 4 and 5 provided in the junction box 2 and the power supply 3 may be female and male terminals, respectively. In the power-supply unit 1 shown in FIG. 1, each electric connection box side terminal 4 is directly plugged into its corresponding power supply side terminal 5 thereby to support and be fixed to each other. The junction box 2 and the power supply 3 which are thus electrically connected require no harness for connection therebetween. Thus, the cost and the loss in mounting the power supply 3 to the vehicle can be kept low.

In the power-supply unit 1 shown in FIG. 1, the junction box 2 and the power supply 3 are electrically and mechanically connected only by the terminals 4, 5, so that the installation and the maintenance of the power supply 3 can be facilitated.

Figure 3:
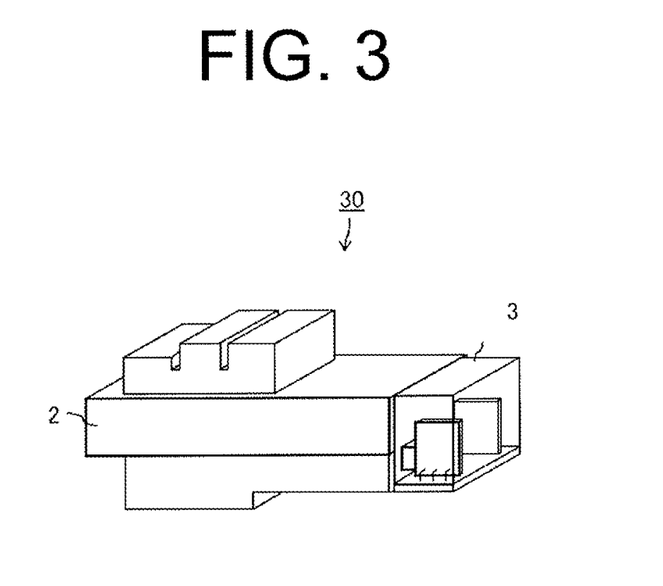
FIG. 3 is a perspective view of a power-supply unit according to an alternative embodiment of the present invention.
Figure 4A:
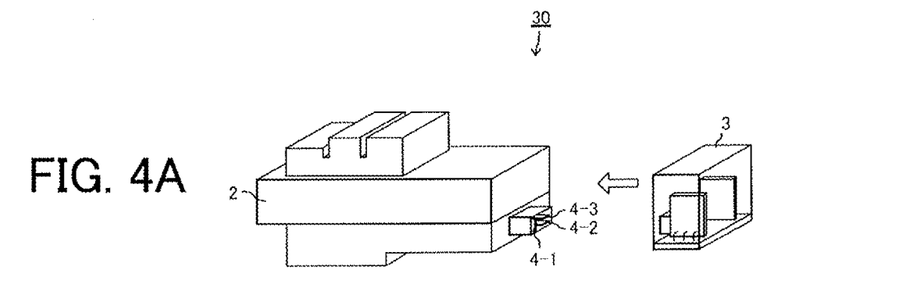
FIG. 4A is a perspective view of a power supply and a junction box of the power-supply unit of FIG. 3, showing a state before the power supply is mounted to the junction box.
Figure 4B:
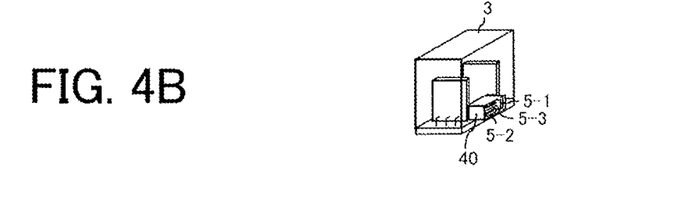
FIG. 4B is a perspective view of the power supply of FIG. 4A.

Furthermore, the respective terminals 5 of the power supply 3 are disposed on the lower side of the power supply 3 in a manner that the respective terminals 5-1, 5-2, 5-3 are dispersed in the lower side of the power supply 3, so that the power supply 3 is supported securely by the junction box 2. FIG. 3 shows a power-supply unit according to the alternative embodiment of the present invention, designated generally by 30. FIG. 4A is a perspective view of the power-supply unit 30 before the power supply 3 is mounted to the junction box 2. FIG. 4B is a perspective view of the power supply 3 of FIG. 4A, showing a plurality of female terminals 5 provided in the power supply 3. It is noted that like or same elements in FIGS. 3, 4A, 4B are designated by the same reference numerals as those in FIGS. 1, 2A, 2B.

As in the case of the embodiment of FIG. 1, the power-supply unit 30 shown in FIG. 3 includes the junction box 2 and the power supply 3 mounted to the junction box 2.

Figure 4C:
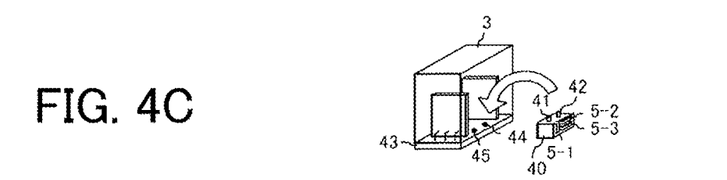
FIG. 4C is a perspective view of the power supply of FIG. 4A, showing a state before a terminal box is mounted to the power supply.

As shown in FIG. 4C, the power supply 3 has a terminal box 40 and a substrate 43. The terminal box 40 has a plurality of terminals 5 (or an input terminal 5-1, an output terminal 5-2 and a GND terminal 5-3 on the power supply side) and projections 41, 42. The substrate 43 has formed therethrough holes 44, 45 into which the projections 41, 42 of the terminal box 40 are fitted, respectively, so that the terminal box 40 is fixed to the substrate 43.

The power-supply unit 30 of FIG. 3 differs from the power-supply unit 1 shown in FIG. 1 is in that the power supply 3 is fixed to a side of the junction box 2. As compared with the power-supply unit 1 shown in FIG. 1, the power-supply unit 30 can be made with a reduced height.

As in the power-supply unit 1 of FIG. 1, terminals 4 are directly plugged into their corresponding terminals 5 thereby to support and be fixed to each other. The junction box 2 and the power supply 3 thus electrically connected require no harness for connection therebetween. Thus, the cost and the loss in mounting the power supply 3 to the vehicle can be kept low.

As in the case of the power-supply unit 1 of FIG. 1, the junction box 2 and the power supply 3 of the power-supply unit 30 of FIG. 3 are electrically and mechanically connected only by the terminals 4, 5, so that the installation and the maintenance of the power supply 3 can be facilitated.

Figure 5:
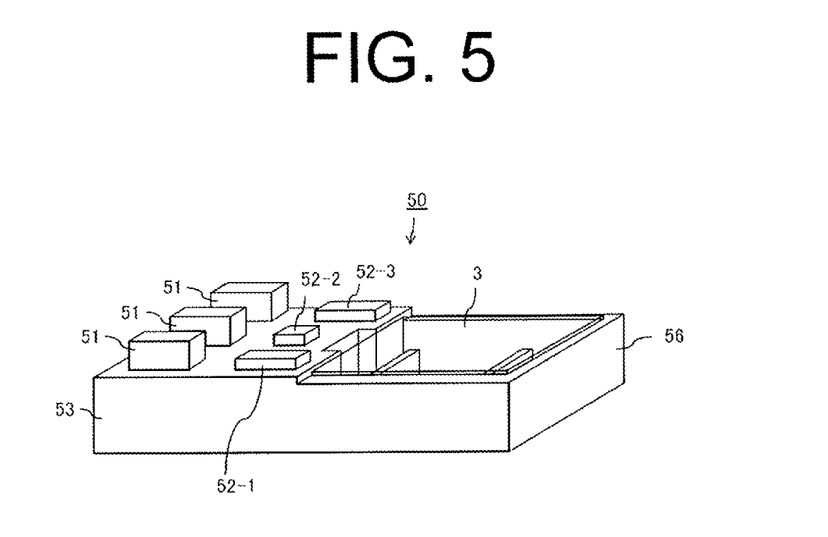
FIG. 5 is a perspective view of a power-supply unit according to another alternative embodiment of the present invention.

FIG. 5 shows a power-supply unit according to another alternative embodiment of the present invention, designated generally by 50. It is noted that in FIG. 5, like or same reference numerals are designated by the same reference numerals as those in FIG. 1. The power-supply unit 50 shown in FIG. 5 includes a plurality of terminal boxes 51, a fuse box 53 (corresponding to the electric connection box of the present invention) having a plurality of fuses 52 (or 52-1, 52-2, 52-3) and the power supply 3 mounted to the fuse box 53.

Figure 6A:
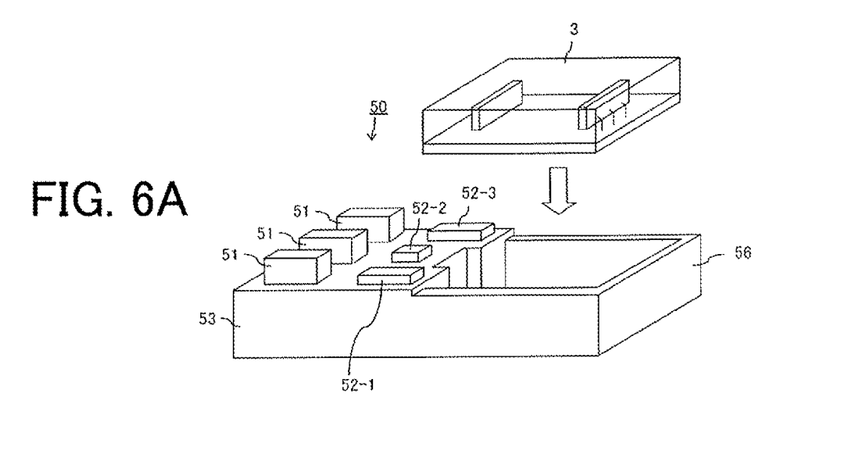
FIG. 6A is a perspective view of a power supply and a fuse box of the power-supply unit of FIG. 5, showing a state before the power supply is mounted to the fuse box.
Figure 6B:
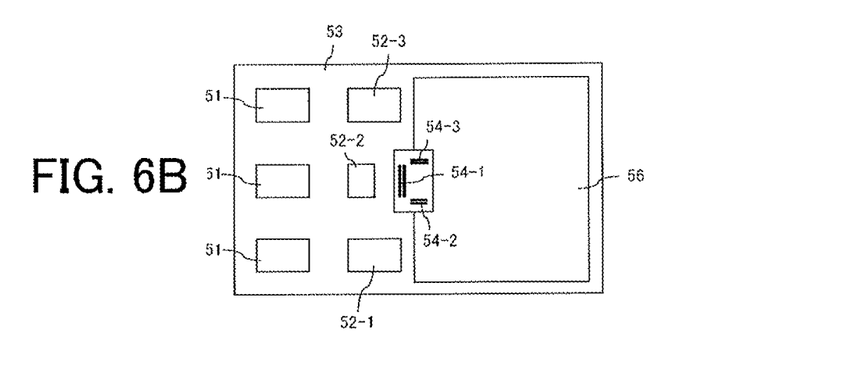
FIG. 6B is plan view of the fuse box of FIG. 6A.

FIG. 6A is a perspective view of the power-supply unit 50 before the power supply 3 is mounted to the fuse box 53. FIG. 6B is plan view of the fuse box 53 of FIG. 6A. As shown in FIG. 6B, the fuse box 53 has a plurality of female terminals 54 (or an input terminal 54-1, an output terminal 54-2 and a GND terminal 54-3 on the electric connection box side).

As shown in FIGS. 5, 6A and 6B, the fuse box 53 includes a power-supply enclosure 56 for receiving and holding therein the power supply 3. The power supply 3 has such a height that the power supply 3 is fitted within the power-supply enclosure 56 of the power-supply unit 50 without projecting out thereof when the power supply 3 is received and held in place in the power-supply enclosure 56 as shown in FIG. 5. Thus, the fuse box 53 can support and hold therein the power supply 3 directly, so that not extra space is required for installation of the power supply 3 in the vehicle.

Figure 6C:
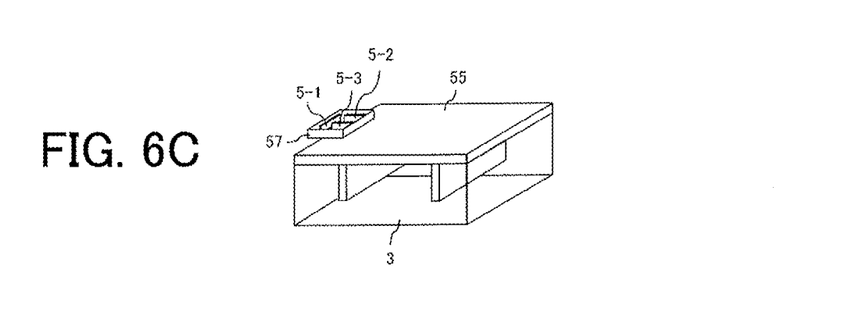
FIG. 6C is a perspective view of the power supply of FIG. 6A.

As shown in FIG. 6C, the power supply 3 has a terminal box 57 on the lower surface of a substrate 55. The terminal box 57 has a plurality of male terminals 5 (or an input terminal 5-1, an output terminal 5-2 and a GND terminal 5-3 on the power supply side) that are electrically and mechanically connected to the respective terminals 54 of the fuse box 53.

Alternatively, the terminals 54 of the fuse box 53 may be male terminals and the terminals 5 of the power supply 3 may be female terminals, respectively. In the power-supply unit 50 shown in FIG. 5, each terminal 54 plugged in its corresponding terminal 5 thereby to support and be fixed to each other. The fuse box 53 and the power supply 3 thus electrically connected requires no harness for connection therebetween. Thus, the cost and the loss in mounting the power supply 3 to the vehicle can be kept low.

The fuse box 53 and the power supply 3 of the power-supply unit 50 of FIG. 5 are electrically and mechanically connected only by the terminals 54, 5, so that the power supply 3 is directly supported by and fixed to the fuse box 53 in the power-supply enclosure 56, which helps to facilitate the installation and the maintenance of the power supply 3.

Figure 7:
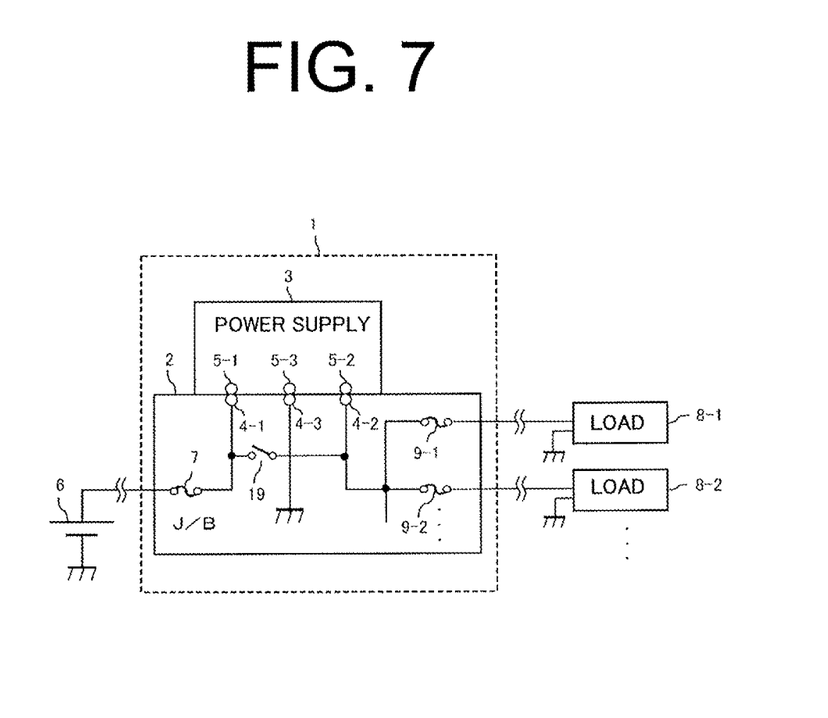
FIG. 7 shows an example of a circuit diagram of the junction box.

FIG. 7 is an example of circuit diagram of the junction box 2. The junction box 2 shown in FIG. 7 includes a fuse 7 provided between the battery 6 and the input terminal 4-1 on the electric connection box side, a plurality of fuses 9 (or fuses 9-1, 9-2, . . . ) provided between the output terminal 4-2 on the electric connection box side and a plurality of respective loads 8 (or loads 8-1, 8-2, . . . ) and a relay 19 operable to connect the input terminal 4-1 on the electric connection box side and the output terminal 4-2 on the electric connection box side. When the relay 19 is ON, electric power of the battery 6 is supplied directly to the load 8 and when the relay 19 is OFF, electric power of the battery 6 is supplied to the load 8 only after the electric power is boosted at the power supply 3.

The GND terminal 4-3 on the electric connection box side of the junction box 2 is connected to the GND.

Figure 8:
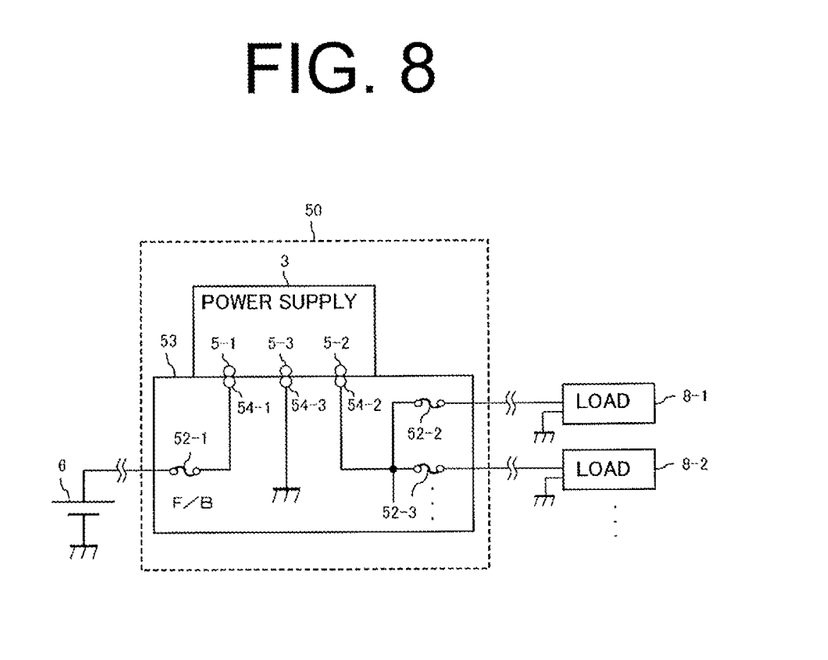
FIG. 8 shows an example of a circuit diagram of the fuse box.

FIG. 8 is an example of circuit diagram of the fuse box 53. The fuse box 53 includes a fuse 52-1 provided between the battery 6 and the input terminal 54-1 on the electric connection box side and fuses 52-2, 52-3 provided between the output terminal 54-2 on the electric connection box side and the respective loads 8-1, 8-2.

The GND terminal 54-3 on the electric connection box side of the fuse box 53 is connected to the GND.

Figure 9:
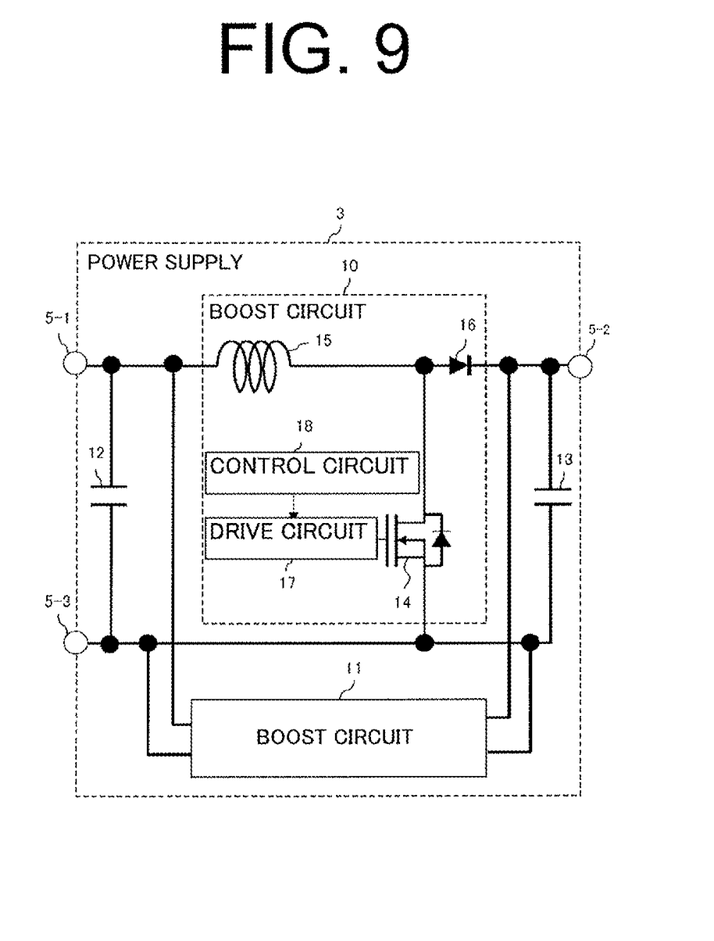
FIG. 9 shows an example of a circuit diagram of the power supply.

FIG. 9 is an example of circuit diagram of the power supply 3. The power supply 3 includes boost circuits 10, 11 connected parallel to each other, a capacitor 12 provided between the input terminal 5-1 on the power supply side and the inputs of the boost circuits 10, 11 and a capacitor 13 provided between the output terminal 5-2 on the power supply side and the outputs of the boost circuits 10, 11. Since the boost circuits 10, 11 are substantially identical, the following will describe only the boost circuit 10. The power supply 3 may include either one of the boost circuits 10 or 11.

The boost circuit 10 includes a MOSFET (Metal Oxide Semiconductor FIELD Effect Transistor) 14 as an switching element, a coil 15 provided between the input terminal 5-1 on the power supply side and the MOSFET 14, a rectifying diode 16 provided between the MOSFET 14 and the output terminal 5-2 on the power supply side, a drive circuit 17 for driving the MOSFET 14 and a control circuit 18. The control circuit 18 is driven by software or hardware. When software is used, the control circuit 18 includes a CPU and a memory and is driven in a manner that the CPU reads a control program stored in the memory for execution of the control program.

When the engine is started by the starter motor by turning on the ignition switch or when the engine is restarted from the state of no idling, so that the voltage of the battery 6 (e.g. 12V) is dropped temporary, the control circuit 18 operates so as to boost the voltage of the input terminal 5-1 on the power supply side by switching the MOSFET 14 at a predetermined frequency (e.g. 300-600 kHz), thereby to keep constant the voltage at the output terminal 5-2 on the power supply terminal (or voltage inputted to the load 8-1 or 8-2).

Additionally, the control circuit 18 operates to keep the MOSFET 14 in off state after the voltage of the battery 6 dropped temporary has been resumed to its original level, with the result that an electric current flows from the input terminal 5-1 on the power supply side to the output terminal 5-2 on the power supply side through the diode 16 and the electric power is supplied to the loads 8-1, 8-2 and the like, accordingly.

As compared with the conventional boost circuit operable to switch the switching elements at a frequency (e.g. 50-150 kHz) that is lower than the above predetermined frequency, the power-supply units 1, 30, 50 according to the above embodiments of the present invention can make the coil 15 to be made smaller. Thus, the power supply 3 can be made small enough for the power supply 3 to be directly supported by and fixed to the junction box 2 or the fuse box 53.

The power-supply units 1, 30, 50 according to the above embodiments can be made small by downsizing the power supply 3 and, therefore, there is no need to provide an extra space for the power-supply units 1, 30, 50 in the vehicle. Thus, the power-supply units 1, 30, 50 can be arranged easily in the vehicle compartment, e.g. at a position that is adjacent to the driver seat.

The power-supply units 1, 30, 50 according to the present invention can make the coil 15 small, thereby making the power supply 3 small and light, accordingly. Therefore, as shown in FIGS. 3, 4, the power supply 3 can be fixed to a side surface of the junction box 2 easily.

What is claimed is:

1. A power-supply unit comprising:
an electric connection box disposed in a vehicle compartment and operable to supply an electric power of a battery to a plurality of loads, the electric connection box including an electric connection box side input terminal electrically connectable to the battery and an electric connection box side output terminal electrically connectable to the plurality of loads; and
a power supply disposed in the vehicle compartment and operable to control a first voltage that is supplied from the battery and outputted through the electric connection box and supply a second voltage that is controlled from the first voltage to the plurality of loads through the electric connection box, the power supply including a power supply side input terminal that is directly connected to the electric connection box side input terminal, wherein the first voltage is inputted to the power supply side input terminal through the electric connection box, and a power supply side output terminal that is directly connected to the electric connection box side output terminal, wherein the second voltage is supplied to the plurality of loads through the electric connection box, wherein the power supply input terminal and the power supply output terminal of the power supply each respectively plug into the corresponding power supply side input terminal and the power supply side output terminal of the electric connection box, and the power supply is directly supported by and fixed to the electric connection box.

2. The power-supply unit according to claim 1, wherein the power-supply unit is disposed at a position adjacent to a driver seat of the vehicle.

3. The power-supply unit according to claim 1, wherein the power supply boosts the first voltage temporarily.

4. The power-supply unit according to claim 1, wherein the power supply further includes a boost circuit having a coil and a switching element that is switched at a predetermined frequency, wherein the coil is small enough to allow the power supply to be directly supported by and fixed to the electric connection box.

5. The power-supply unit according to claim 1, wherein the electric connection box including an power-supply enclosure receiving the power supply.

6. The power-supply unit according to claim 1, wherein the electric connection box is a junction box.

7. The power-supply unit according to claim 1, wherein the electric connection box is a fuse box.

8. The power-supply unit according to claim 1, wherein the power supply side input terminal and the power supply side output terminal are dispersed in the lower side of the power supply.

9. The power-supply unit according to claim 1, wherein power supply is fixed to a side of the electric connection box.

10. A power supply, wherein the power supply is operable to control a first voltage that is outputted through an electric connection box for distributing an electric power from a battery to a plurality of loads and to output a second voltage that is controlled from the first voltage to the plurality of loads through the electric connection box, the power supply comprising:

a power supply side input terminal that is directly connected to an electric connection box side input terminal provided in the electric connection box, the power supply side input terminal is connected to the first voltage being inputted through the electric connection box; and a power supply side output terminal that is directly connected to an electric connection box side output terminal provided in the electric connection box, the power supply side output terminal through which the second voltage is supplied to the plurality of loads via the electric connection box, wherein the power supply input terminal and the power supply output terminal of the power supply each respectively plug into the corresponding power supply side input terminal and the power supply side output terminal of the electric connection box, and the power supply is directly supported by and fixed to the electric connection box.

11. The power-supply unit according to claim 1, wherein the power supply is a battery that supplies electric power to a starter motor.

12. The power-supply unit according to claim 1, wherein the power supply includes boost circuits.

13. The power-supply unit according to claim 12, wherein the power supply keeps the battery voltage constant via the boost circuits and supplies the battery voltage to plural loads.

* * * * *